April 4, 1961  J. LUSTYAN  2,977,739

ROTARY LAWN MOWER CONSTRUCTION

Filed July 25, 1957  2 Sheets-Sheet 1

INVENTOR
John Lustyan
BY Robert M. Dunning
ATTORNEY

April 4, 1961   J. LUSTYAN   2,977,739
ROTARY LAWN MOWER CONSTRUCTION
Filed July 25, 1957   2 Sheets-Sheet 2
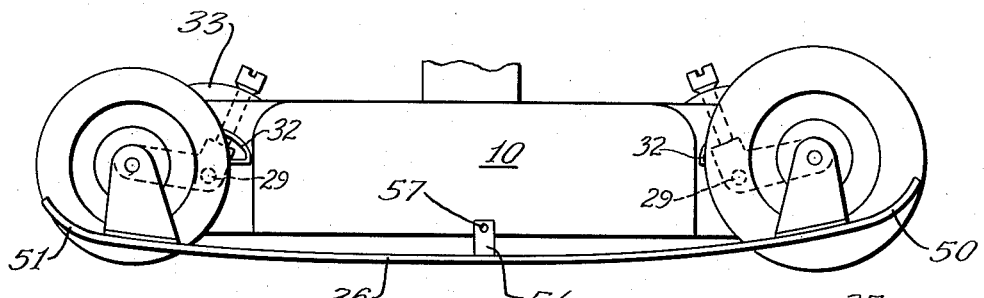
Fig. 4
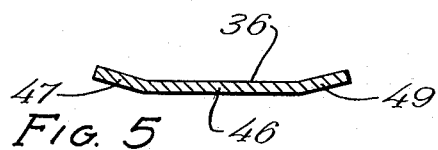
Fig. 5
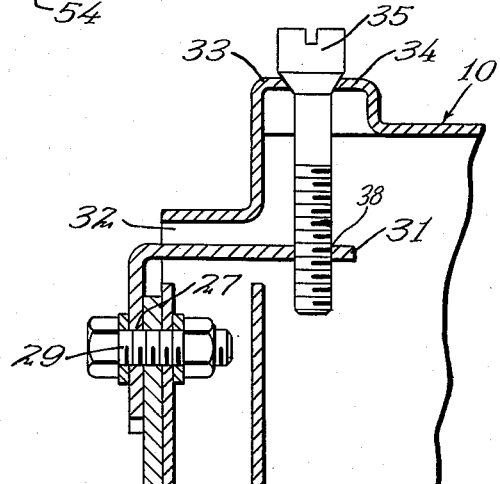
Fig. 6
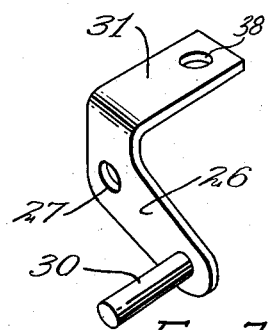
Fig. 7
Fig. 8
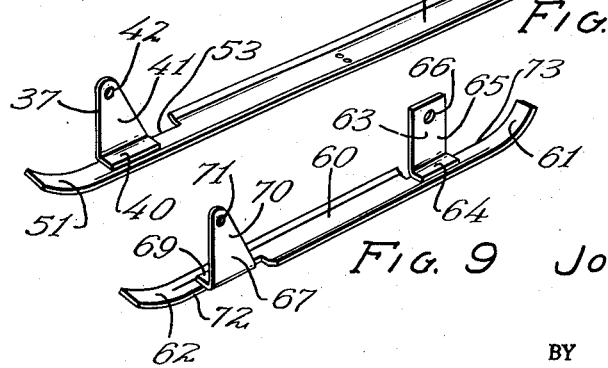
Fig. 9
Fig. 10
INVENTOR
John Lustyan
BY Robert M. Dunning
ATTORNEY

2,977,739
ROTARY LAWN MOWER CONSTRUCTION

John Lustyan, 1043 Burgess, St. Paul, Minn.

Filed July 25, 1957, Ser. No. 674,214

3 Claims. (Cl. 56—25.4)

This invention relates to an improvement in rotary lawn mower construction and deals particularly with an apparatus capable of maintaining the rotor in properly spaced relation to the ground as the lawn mower passes over an uneven surface.

The use of power driven rotary lawn mowers has become increasingly popular during the last few years. Lawn mowers of this type comprise a wheeled frame which supports a rotatable cutting blade mounted upon a vertical axis. A motor is mounted upon the frame for rotating this blade. Rotation of the blade cuts off the grass near the surface of the ground and as a result the mower may be used with grass of considerable depth.

One of the principal advantages of this type of construction lies in its simplicity and low cost. Probably the biggest single disadvantage of this type of construction lies in the fact that as the wheeled frame passes over uneven ground, the blade does not cut off the grass to an even height. In other words, as the mower frame passes over a hump or a convex surface, the blade either cuts off the grass too close to the ground or else actually cuts into the ground. If the blade strikes a hard object such as a rock while traveling over such a convex surface, injury may readily be caused to the blade or other portions of the mower.

Attempts have been made to eliminate this difficulty by placing one of the wheels of the frame substantially in transverse alignment with the rotating blade shaft. While this arrangement has reduced the damage caused by movement of the mower over convex portions of the ground, it has not entirely eliminated the difficulty. It is an object of the present invention to provide an apparatus which may either comprise an attachment to the lawn mower or may form a part thereof and which will positively prevent the blade from digging into the ground unless the mower passes over a narrow hump which will pass between the wheels.

An object of the present invention resides in the provision of a pair of skids or runners which are attached to the mower frame or which form a part thereof and which project below the level of the cutter blade immediately on either side of the blade. These runners support the frame of the mower in spaced relation to the ground and hold the cutter blade from contact with the ground as the mower frame passes over a convex surface.

Many lawns are provided with terraces or banks which extend from a flat area to a downwardly inclined or sloping area. In cutting these banks ti is common practice to move the mower over the horizontal flat surface and to allow the mower to run down the inclined bank as far as the handle of the mower will permit while the operator remains on horizontal ground. The mower is then pulled back upwardly and the operation repeated to cut the next strip. Reel type mowers cut the grass to an approximately even height while passing over the bend between the horizontal portion and the bank. However, when the front wheels of a rotary mower are pushed from the horizontal surface to the inclined surface, the center portion of the mower frame between the front and rear walls drops until the cutting blade digs into the ground. By providing runners or guides beneath the mower frame on either side of the cutter blade which project below the level of the blade, the grass can be evenly cut over such a curved surface as the runners hold the blade at the desired elevation above the ground at all times.

A further feature of the preferred form of construction of the invention lies in the provision of runners which are supported by the wheel axes and are rotatable in unison therewith. Rotary mowers are often provided with wheels which may be adjusted in elevation relative to the frame so as to cut the grass at a desired height from the ground. In preferred form, the runners are supported by the wheel axle shafts so that if any wheel is raised or lowered, the runner will be adjusted accordingly.

A further feature of the present invention resides in the provision of a mower of the type described having a frame including a front wheel and a rear wheel, both of which are adjustable in height relative to the supporting frame. A runner is supported by the wheel brackets so as to be vertically adjustable together therewith. The runner is flexible to some extent and the center portion of the runner is anchored at a predetermined height relative to the frame. When the front and rear wheels are lowered relative to the frame, the runner is bent to provide a concave undersurface. When the front and rear wheels are raised, the undersurface of the runner is bent into a concave shape.

These and other objects and novel features of the present invention will be more clearly and fully set forth in the following specification and claims.

In the drawings forming a part of this specification:

Figure 4 is a view similar to Figure 1 showing the form of the runner in a different adjusted position of the wheels.

Figure 5 is a cross sectional view through a typical form of runner.

Figure 6 is a cross sectional view through a portion of the mower frame showing the manner in which the guide rails are adjustable with the wheels.

Figure 7 is a perspective view of a lever arm used for supporting one of the wheels.

Figure 8 is a perspective view of one of the guide runners showing the construction thereof.

Figure 9 is a perspective view of the other guide runner showing the construction thereof.

Figure 10 is a perspective view on a spacing block used for connecting the center portion of a guide runner to the frame of the mower.

Figure 1:
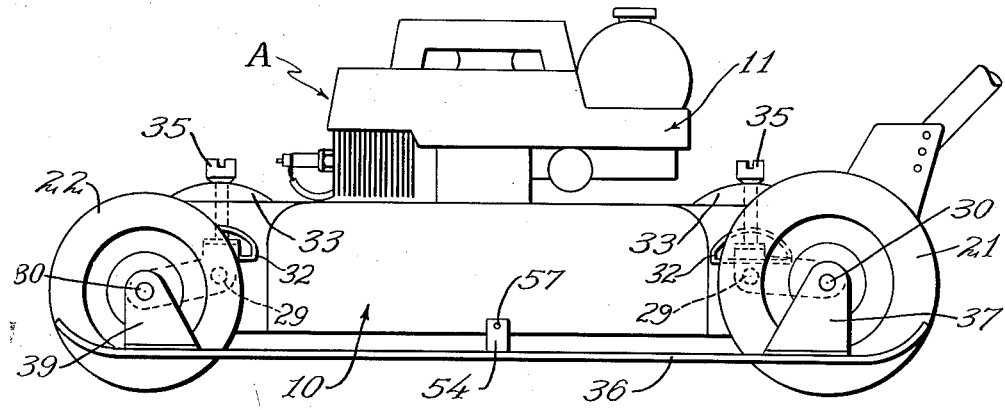
Figure 1 is a side elevational view of a rotary mower showing a runner or guide attached to this side thereof.

Rotary mowers vary considerably in shape and form and obviously the particular shape and design of the runners used in connection with the mower may also vary to fit each individual construction. Thus, in describing the present device it should be understood that the construction illustrated is only typical of a structure which may be used upon a mower and that the specific construction would be somewhat different for each type of mower. However, the same general problems are involved.

In the drawings, the rotary mower is indicated in general by the letter A. The mower includes a frame which is indicated in general by the numeral 10 and which forms a support for a gasoline engine which is indicated by the numeral 11. Obviously, an electric motor could be substituted for the gasoline type of engine used in the motor disclosed.

The frame 10 is generally hollow having an open bottom, the sides of the frame being formed by depending flanges. The front of the frame includes a depending flange 12 shown in the bottom view of Figure 3 and a partial side flange 13 on one side thereof. The frame also includes a rear wall flange 14 which is connected by side wall flange portions 15 and 16. A generally circular depending flange 17 is centrally located in the frame and is connected to the forward ends of the side flanges 15 and 16 and to the rear edge of the side flange 15. On the particular form of mower illustrated there is a gap in the peripheral side wall as indicated at 19 between the front flange 12 and one forward end of the circular flange 17.

Figure 2:
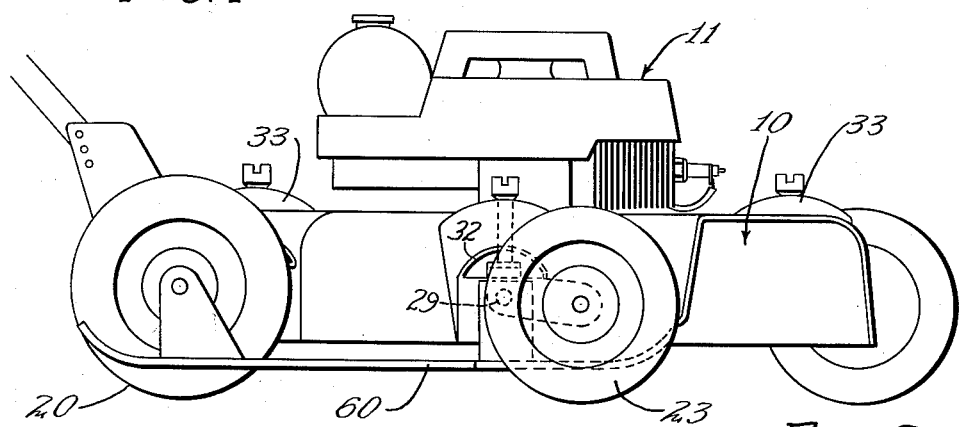
Figure 2 is a side elevational view of a typical mower showing a sde thereof opposite that shown in Figure 1 and showing a runner attached thereto.
Figure 3:
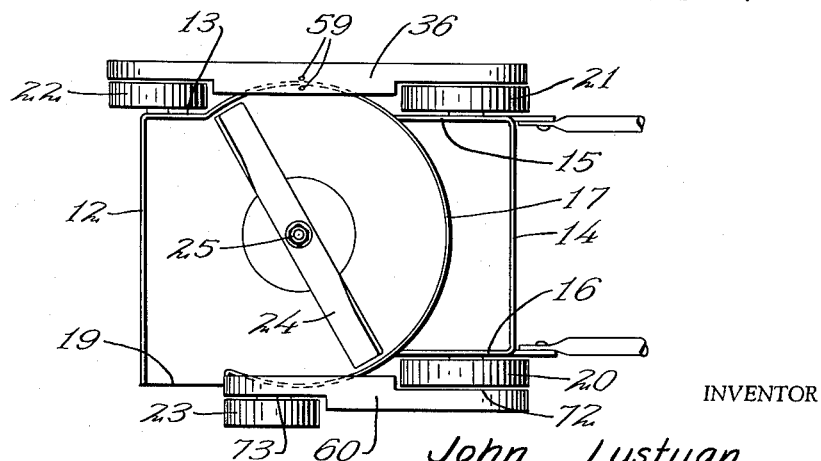
Figure 3 is a bottom plan view of the mower showing the location of the runners thereon.

The frame 10 is supported by four wheels. The rear wheels 20 and 21 are in opposed relation. One front wheel 22 is mounted at the forward end of the frame 10 in a manner which will be later described in detail. The remaining wheel 23 is mounted between the ends of the frame or is set back from the forward end of the frame as is best indicated in Figures 2 and 3 of the drawings.

A rotary blade 24 is mounted upon a vertical shaft 25 extending through the frame 10 and connected in any suitable way with the engine 11 for rotation thereby. Rotation of the blade 24 acts to cut off grass and other foliage near the surface of the ground. The blade 24 is preferably supported within the confines of the cylindrical flange 17 and slightly above the lower edge thereof. The blade is usually approximately even with the lower edge of the frame.

Figures 4, 6 and 7 show a typical manner in which the wheels may be supported so that the distance between the lower end of the frame and the ground may be varied. In the particular arrangement illustrated, a bell crank lever 26 is provided which includes a pivot aperture 27 designed to accommodate a pivot bolt 29 extending through one of the flanges forming a part of the side of the frame 10. A wheel axle shaft 30 is secured to one end of the lever 26 at a point substantially spaced from the aperture 27 and extending parallel to the axis of the pivot bolt 29. The other end of the lever 26 is bent at right angles as indicated at 31 and extends through a slot such as 32 in the corresponding flange of the frame 10.

In the frame 10 there is provided an arcuate enlargement such as 33 having the axis of the pivot aperture as the center of arcuation. A slot 34 is provided in the cylindrical surface of each of the enlargements 33 and a clamping bolt 35 extends through said slot 34 and threads into an internally threaded opening 38 in the right angularly turned end 31 of the lever 26. By tightening the bolts 35, the lever 26 may be held in any adjusted position. Pivotal movement of each lever 26 about its pivot aperture 27 will act to raise and lower the corresponding wheel axle shaft 30. As all of the wheels are generally similar in form, all of the mechanism is not disclosed.

In order to hold the blade 24 at a desired elevation above the ground, a pair of skids or runners are attached on opposite sides of the frame. One runner 36 is designed to be mounted longitudinally of the frame 10 and to extend between the forward wheel 22 and the rear wheel 21. Right angular brackets 37 and 39 are attached to opposite ends of the runner 36. The bracket 37 includes an anchoring flange 40 secured in surface contact with the upper surface of the runner 36 and includes a vertical flange 41 provided near its upper extremity with an aperture 42. The aperture 42 is of proper diameter to accommodate the wheel axle shaft 30 of the rear wheel 21. The bracket 39 is similarly provided with an anchoring flange 43 and a vertical flange 44 provided with an aperture 45 near its upper extremity designed to accommodate the axle shaft 30 of the front wheel 22.

Each runner is formed as best illustrated in Figures 5 and 8 of the drawings. In cross section, the runner preferably includes a flat horizontal central portion 46 and upwardly beveled side edge portions 47 and 49. The ends 50 and 51 of the runners are preferably turned upwardly to avoid any tendency of the end of the runner to dig into the ground. The inner side of the runner is longitudinally notched as indicated at 52 and 53 on either side of the brackets 37 and 39 so that the runner can fit closely adjacent to the wheels and so that a portion of the runner can actually extend between the wheels 21 and 22.

A spacing block 54 extends beneath one side of the frame 10 and includes an upwardly projecting ear 55 having one or more bolt holes 56 etxending therethrough for the accommodation of a bolt 57 which extends into or through a part of the cylindrical flange 17 opposite the blade shaft 25. This spacing block 54 is secured to the center of the runner 36 by machine screws 59 or other suitable means (Figure 3). The spacing block 54 is designed to hold the center part of the runner 36 at a predetermined elevation above the ground regardless of the position of the various frame supporting wheels. For example, Figure 1 shows the runner 36 in a normal position which the runner would assume when the supporting wheels are adjusted to a substantially mid position between a high adjustment and a low adjustment. Figure 4 of the drawings shows the position of the runner 36 when the wheels have been elevated relative to the frame so that the frame is quite close to the ground. The frame supporting wheels are in the position shown in Figure 4 when the grass is to be cut relatively close to the ground.

A second runner 60 is provided on the opposite side of the frame 10. The runner 60 is preferably of the same cross sectional shape as the runner 36 and is provided with upturned ends 61 and 62 so that the runner will not dig into the ground. A bracket 63 is mounted near the end 61 of the runner and includes a horizontal attaching flange 64 and a vertical flange 65 which is provided with an aperture 66 designed to accommodate the pivot bolt 29 which pivotally supporting the lever 26 which supports the offset wheel 23. The runner is also provided with a bracket 67 including an anchoring flange 69 and a vertical flange 70 which is apertured as indicated at 71 to accommodate the axle shaft 30 of the rear wheel 20.

As is best indicated in Figure 3 of the drawings, the rear end of the runner 60 is notched on its inner surface as indicated at 72 to accommodate the rear wheel 20. The forward end of the runner 60 is notched as indicated at 73 in its outer surface so that the runner 60 may extend inwardly of the offset wheel 23. Due to the shape of the frame, the wheel 23 is spaced outwardly of the plane of the rear wheel 20.

When the runners are in place, the mower may be moved over an arcuate surface without injury to the grass. In the past where mowers of this type have moved over an arcuate surface where the center of arcuation is parallel with the axes of the wheels, the center portion of the mower frame would often contact the ground and the rotating blade would shave the grass from the surface flush with or sometimes beneath the surface of the ground. As a result, it has been impractical to use mowers of this type on lawns having terraces or similar arcuate surfaces. This is prevented by the runners which are disclosed as the runners prevent the center portion of the frame from approaching within a certain predetermined distance of the ground. During such action either the forward wheel 22 or one of the rear wheels 20 or 21 or both of these rear wheels are raised out of contact with the ground and the mower is supported by the remaining wheels and by the runners. Obviously variations must be made to fit lawnmowers of various types and makes.

From the preceding description it will be evident that not only do the runners maintain the cutting blade at the right elevation while traversing uneven ground, but also these runners add materially to the safety of the mowers. With the usual construction, it is possible to injure a foot or hand if it is inserted laterally beneath the mower frame. With the runners in place, such injury is virtually impossible.

In accordance with the patent statutes, I have described the principles of construction and operation of my improvement in rotary lawn mower construction, and while I have endeavored to set forth the best embodiments thereof, I desire to have it understood that changes may be made within the scope of the following claims without departing from the spirit of my invention.

I claim:

1. In combination with a rotary lawn mower having an enclosing frame, a pair of wheels on each side of said frame, parallel wheel shafts connected to said frame and supporting said wheels, and a rotary blade within said frame and substantially flush with the under surface thereof, the wheels on one side of said frame being adjacent to the front and to the rear of the frame, respectively, the wheels on the other side of the frame being adjacent to the rear and to the transverse center of the frame, respectively, and a runner extending longitudinally of the frame on said one side thereof, means securing said runner to said frame intermediate the ends thereof and to the shafts supporting said wheels at the ends thereof on said one side, said runner being supported below the level of said frame, said wheels and wheel shafts on said one side of the frame being adjustable in elevation.

2. In combination with a rotary lawn mower having an enclosing frame, a pair of wheels on each side of said frame, parallel wheel shafts connected to said frame and supporting said wheels, and a rotary blade within said frame and substantially flush with the under surface thereof, a runner element extending between the wheel shafts on each side of said frame and extending in the direction of movement of said frame, said runner elements being on opposite sides of said frame and extending beneath the bottom of said frame, all of said wheels being substantially vertically adjustable, and in which at least one of said runners is flexible and connected to said frame near the longitudinal center thereof, the ends of said runners being adjustable with said wheels.

3. In combination with a rotary lawn mower having an enclosing frame, a pair of wheels on each side of said frame, parallel wheel shafts connected to said frame and supporting said wheels, and a rotary blade within said frame and substantially flush with the under surface thereof, a runner element extending between the wheel shafts on each side of said frame and extending in the direction of movement of said frame, said runner elements being on opposite sides of said frame and extending beneath the level of the bottom of said frame, said wheels being adjustable in elevation, means connecting one of said runners intermediate its ends to said frame at a location substantially abrest of the axis of rotation of said rotary blade, said one runner being connected to said wheel shafts adjoining its ends, said one runner being sufficiently flexible to permit the runner ends to adjust in elevation with said wheels to which they are attached.

References Cited in the file of this patent

UNITED STATES PATENTS

| | | |
|---|---|---|
| 1,651,759 | Felton | Dec. 6, 1927 |
| 1,954,579 | Smith | Apr. 10, 1934 |
| 2,154,564 | Eisenlohr | Apr. 18, 1939 |
| 2,167,222 | Shelor | July 25, 1939 |
| 2,551,817 | Taylor | May 8, 1951 |
| 2,671,299 | Orr | Mar. 9, 1954 |
| 2,675,661 | Titzer | Apr. 20, 1954 |
| 2,719,396 | Morris et al. | Oct. 4, 1955 |
| 2,791,080 | Shaw | May 7, 1957 |
| 2,806,339 | Whitney | Sept. 17, 1957 |
| 2,836,430 | Langenbacher | May 27, 1958 |

FOREIGN PATENTS

| | | |
|---|---|---|
| 301,360 | Switzerland | Sept. 15, 1954 |